March 15, 1927.
G. B. FILMER
1,620,880
PROCESS OF PRODUCING METALLIC OXIDES
Filed Dec. 12, 1924
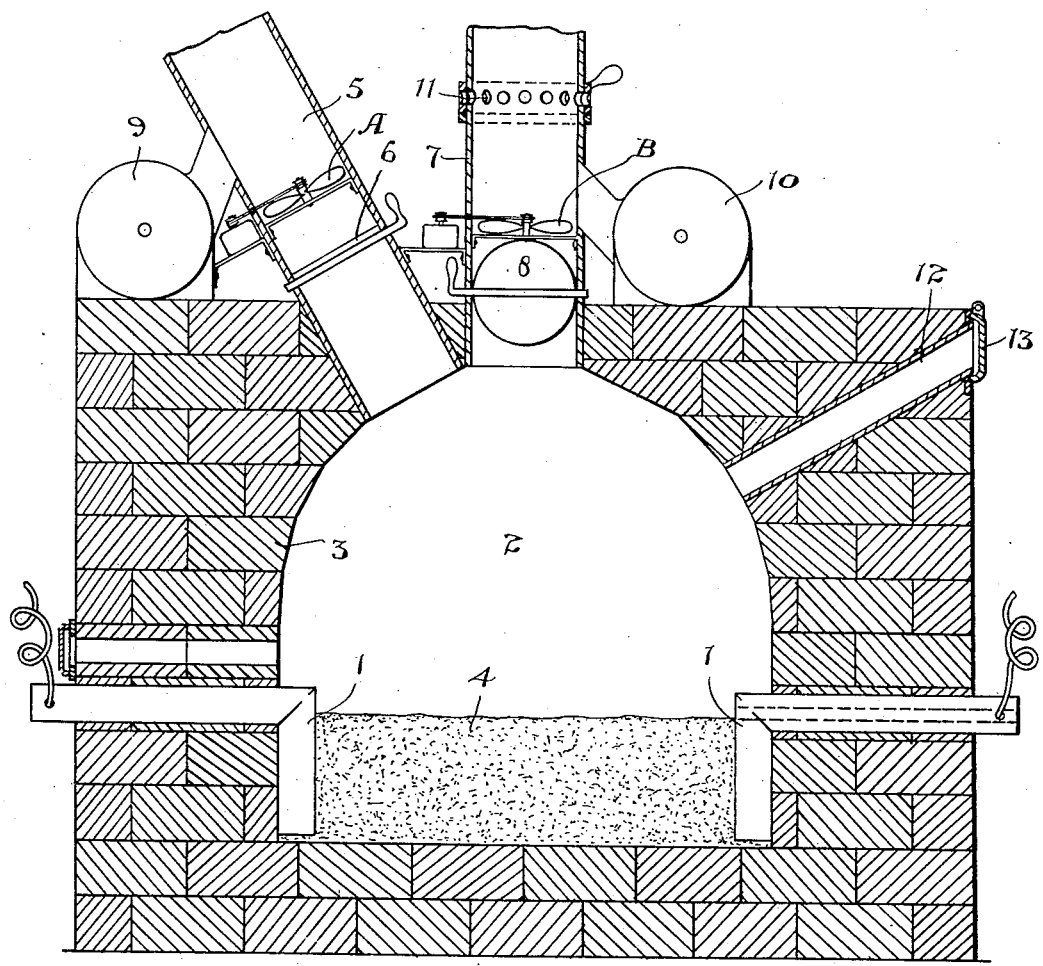
Inventor.
George B. Filmer
by H. J. S. Dennison
Atty.

Patented Mar. 15, 1927.

1,620,880

UNITED STATES PATENT OFFICE.

GEORGE B. FILMER, OF TORONTO, ONTARIO, CANADA, ASSIGNOR OF ONE-HALF TO WALTER JAMES HARVEY, OF TORONTO, ONTARIO, CANADA.

PROCESS OF PRODUCING METALLIC OXIDES.

Application filed December 12, 1924. Serial No. 755,487.

The principal objects of the invention are, to devise a simple and economical method of producing metallic oxides, and further to produce such oxides free from impurities at the lowest possible expense.

The principal feature of the invention consists in producing a molten bed of refractory material by electrically heating same and then introducing into the molten mass the metal to be oxidized and then subjecting the resultant fume to contact with air or oxygen to produce an oxide of the metal melted.

In carrying this invention into effect I use an electric furnace of the retort type illustrated in the drawing as in vertical section.

Suitable electrodes 1 in any suitable number and arrangement are placed within the chamber 2 enclosed by the refractory walls 3.

A bed of a suitable refractory 4 is arranged between the electrodes and upon application of the electrical current to the electrodes this bed is brought to a molten state.

In the form of the furnace shown two flues are provided, the flue 5 closed by the damper 6 being adapted to convey waste or obnoxious gases from the furnace when it is first ignited and the flue 7 closed by a damper 8 is adapted to conduct the metallic gases from the furnace.

Suitable exhaust fans 9 and 10 are provided to assist in the removal of the gases and in the flue 7 is arranged a controlled air passage 11 which allows air to enter the flue and mix with the metallic gases to oxidize same.

It may be found advisable under certain conditions to drive the fume upwardly through the flues without the introduction of air at that point and fans A and B are provided in the flues as shown.

In the operation of this process the furnace is first prepared with a bed of a suitable refractory and this bed is first heated with or without a suitable starter or ionizing material placed in a thin line or layer between the electrodes and preferably moistened with water, a suitable material to accomplish the purpose being in the form of NaOH prepared lye.

When the electric current is turned on to the electrodes the fusing of the ionizer commences and this starts the material adjacent to it to a condition of conductivity and the heat then continues to spread through the refractory until it is brought to a molten state.

During this preparation there is a considerable amount of foreign matter burnt off and the gases arising are conducted from the volatilizing chamber through the exhaust flue 5.

When finally a molten slag is produced the furnace is ready for the introduction of the metal to be volatilized. This is introduced in any suitable manner, a chute 12 being herein shown closed by a door 13 of the outside of the furnace or may be fed in through a hollow electrode.

The metal to be oxidized is provided in any suitable form and is fed into the interior of the furnace through the chute 12 and such metal falling into the molten slag, which is of course at a very high temperature, the metal is immediately melted and the fume arising is carried through the flue 7, the flue 5 being closed by the damper 6 and the damper 8 being opened.

As the fume rises through the flue 7 air is admitted in any desired quantity in the flue or by an arrangement of suitable pipe leading to the inside of the furnace chamber and mixing with the fume in passage it converts the metal fume to an oxide which is precipitated in a suitable receptacle, not shown.

It will be readily understood that the slags used for the melting of the metals may be chosen to suit the kind of metal to be treated, for instance, when zinc oxide is to be produced a slag of singulo silicate is used, which, after the chemical starter has been burnt off, remains in a molten state clean and free from impurities.

Zinc is then fed into the molten slag and first desulphurization takes place and then following the increase of the temperature the metal is driven off in the form of a fume.

It will be understood that a certain amount of the metal is absorbed in the slag and when this reaches a certain degree of saturation the contents of the furnace will be removed. The metal may be drawn off from the slag and this of course is pure electrolytic metal and it may be used as a raw material in producing a pure zinc oxide for medicinal purposes.

Many other oxides may be produced by the same method.

The consumption of electrical energy operating a method such as described is extremely low and the electrodes are protected against consumption as they are practically entirely enclosed from the air.

A process such as described entirely avoids the introduction of impurities in the finished product.

What I claim as my invention is:—

1. A process of producing metallic oxides, consisting in first providing a molten mass of substantially non-volatile material within a closed chamber, then introducing a metallic substance into the molten mass, then conducting the fume therefrom, and finally introducing oxygen into the fume.

2. A process of producing metallic oxides, consisting in preparing a bed of refractory material within a closed electric furnace and arranging an ionizer between the electrodes, applying electric energy to the electrodes, drawing off the volatile gases produced in melting the refractory, then introducing the metallic substance to be volatilized into the molten mass, then drawing off the fume and conducting it into the presence of air to effect the oxidation of the metal fume.

3. A process of producing metallic oxides, consisting in providing a quantity of molten refractory material within a closed chamber, then maintaining said refractory material in a molten state by the passage of an electric current therethrough, then introducing a metallic substance into the molten mass, then removing impurities rising in a fume from the molten mass, then conducting the desired metallic fume from the chamber and finally mixing air with said fume.

GEORGE B. FILMER, Bt.